United States Patent
Franciosi et al.

(10) Patent No.: US 10,552,209 B2
(45) Date of Patent: *Feb. 4, 2020

(54) SYSTEM AND METHOD FOR THROTTLING FOR LIVE MIGRATION OF VIRTUAL MACHINES

(71) Applicant: Nutanix, Inc., San Jose, CA (US)

(72) Inventors: Felipe Franciosi, Cambridge (GB);
Miao Cui, New York, NY (US);
Malcolm Crossley, Cambridge (GB);
Peter Turschmid, Seattle, WA (US)

(73) Assignee: NUTANIX, INC., San Jose, CA (US)

( * ) Notice: Subject to any disclaimer, the term of this patent is extended or adjusted under 35 U.S.C. 154(b) by 160 days.

This patent is subject to a terminal disclaimer.

(21) Appl. No.: 15/922,211

(22) Filed: Mar. 15, 2018

(65) Prior Publication Data

US 2019/0286476 A1    Sep. 19, 2019

(51) Int. Cl.
*G06F 9/455*   (2018.01)
*G06F 9/48*    (2006.01)
*G06F 3/06*    (2006.01)

(52) U.S. Cl.
CPC .......... *G06F 9/4856* (2013.01); *G06F 3/0647* (2013.01); *G06F 9/45558* (2013.01); *G06F 2009/4557* (2013.01)

(58) Field of Classification Search
CPC .. G06F 9/4856; G06F 3/0647; G06F 9/45558; G06F 2009/4557
See application file for complete search history.

(56) References Cited

U.S. PATENT DOCUMENTS

| | | |
|---|---|---|
| 8,549,518 B1 | 10/2013 | Aron et al. |
| 8,601,473 B1 | 12/2013 | Aron et al. |
| 8,850,130 B1 | 9/2014 | Aron et al. |
| 9,760,392 B1 * | 9/2017 | Dantkale ............. G06F 9/45558 |
| 9,772,866 B1 | 9/2017 | Aron et al. |
| 2008/0222375 A1 * | 9/2008 | Kotsovinos ........... G06F 9/5083 711/162 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Adam Lee
(74) *Attorney, Agent, or Firm* — Foley & Lardner LLP (57) ABSTRACT

A system and method include initiating a live migration of a virtual machine from a first host machine to a second host machine. The system and method include copying an initial copy of data stored in a memory of the first host machine to a memory of the second host machine, determining a set of modified data stored in the memory of the first host machine, determining that transferring the set of modified data stored in the memory of the first host machine exceeds a downtime limit, determining that an increased throttling of the virtual machine executing on the first host machine does not exceed a throttling limit, applying the increased throttling to the virtual machine executing on the first host machine, and copying the set of modified data while the increased throttling is applied to the virtual machine executing on the first host machine.

20 Claims, 6 Drawing Sheets

(56) References Cited

U.S. PATENT DOCUMENTS

| | | | | |
|---|---|---|---|---|
| 2009/0007106 | A1* | 1/2009 | Araujo, Jr. | G06F 9/54 718/1 |
| 2010/0228913 | A1* | 9/2010 | Czezatke | G06F 11/1451 711/112 |
| 2011/0066597 | A1* | 3/2011 | Mashtizadeh | G06F 3/0617 707/640 |
| 2011/0197039 | A1* | 8/2011 | Green | G06F 3/0617 711/162 |
| 2011/0264788 | A1* | 10/2011 | Costa | G06F 9/4856 709/224 |
| 2011/0320556 | A1 | 12/2011 | Reuther | |
| 2012/0017031 | A1* | 1/2012 | Mashtizadeh | G06F 9/45558 711/6 |
| 2012/0017114 | A1* | 1/2012 | Timashev | G06F 11/1469 714/15 |
| 2012/0096458 | A1* | 4/2012 | Huang | G06F 9/45533 718/1 |
| 2012/0221710 | A1* | 8/2012 | Tsirkin | G06F 9/4856 709/224 |
| 2013/0132057 | A1* | 5/2013 | Deng | G06F 3/0613 703/21 |
| 2013/0185719 | A1* | 7/2013 | Kar | G06F 9/45558 718/1 |
| 2015/0149999 | A1* | 5/2015 | Ramanathan | G06F 9/4856 718/1 |
| 2015/0212844 | A1* | 7/2015 | Tsirkin | G06F 9/45558 718/1 |
| 2015/0381589 | A1* | 12/2015 | Tarasuk-Levin | H04L 63/0428 713/193 |
| 2016/0011900 | A1 | 1/2016 | Reddy et al. | |
| 2017/0212784 | A1* | 7/2017 | Johnsen | H04L 61/2038 |
| 2018/0203715 | A1* | 7/2018 | Granado | G06F 8/656 |
| 2018/0357092 | A1* | 12/2018 | Kaul | G06F 9/45558 |
| 2019/0065229 | A1* | 2/2019 | Tsirkin | H04L 41/082 |
| 2019/0265995 | A1* | 8/2019 | Franciosi | G06F 9/45558 |
| 2019/0286475 | A1* | 9/2019 | Mani | G06F 9/4856 |

OTHER PUBLICATIONS

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Jan. 12, 2016), from https://nutanixbible.com/.

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jun. 25, 2018), from https://nutanixbible.com/.

Poitras, Steven. "The Nutanix Bible" (Jan. 3, 2017), from https://nutanixbible.com/.

Poitras, Steven. "The Nutanix Bible" (Jan. 3, 2018), from https://nutanixbible.com/.

Poitras, Steve. "The Nutanix Bible" (Sep. 4, 2015), from https://nutanixbible.com/.

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jan. 8, 2019), from https://nutanixbible.com/.

Poitras, Steven. "The Nutanix Bible" (Jun. 8, 2017), from https://nutanixbible.com/.

Poitras, Steven. "The Nutanix Bible" (Jun. 9, 2015), from http://stevenpoitras.com/the-nutanix-bible/ (Publication date based on indicated capture date by Archive.org; first publication date unknown).

Poitras, Steven. "The Nutanix Bible" (Jun. 9, 2016), from https://nutanixbible.com/.

* cited by examiner

SYSTEM AND METHOD FOR THROTTLING FOR LIVE MIGRATION OF VIRTUAL MACHINES

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The one or more virtual machines utilize the hardware resources of the underlying one or more host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. Each virtual machine is managed by a hypervisor or virtual machine monitor. Occasionally, the virtual machines may be migrated from one host machine to another host machine. Typically, such migration occurs when the virtual machine is not in use. In some instances, live migration of a virtual machine that is in use is done by copying data stored in memory to the second host machine incrementally until a final data copy can be performed. However, the present day mechanism for live migrating a virtual machine from a first host machine to a second host machine can result in convergence periods that are excessively long, never converge, or degrade performance of the virtual machine below a user acceptability.

SUMMARY

In accordance with at least some aspects of the present disclosure, a method is disclosed. The method includes initiating a live migration of a virtual machine from a first host machine to a second host machine. The method also includes copying an initial copy of data stored in a memory of the first host machine to a memory of the second host machine. The method further includes determining, using a live migration tool, a set of modified data stored in the memory of the first host machine; determining, using the live migration tool, that transferring the set of modified data stored in the memory of the first host machine exceeds a downtime limit; determining, using the live migration tool, that an increased throttling of the virtual machine executing on the first host machine does not exceed a throttling limit; applying the increased throttling to the virtual machine executing on the first host machine; and copying the set of modified data while the increased throttling is applied to the virtual machine executing on the first host machine.

In accordance with another aspect of the present disclosure, another method is disclosed. The method includes copying an initial copy of data stored in a memory of a first host machine to a memory of a second host machine. The method further includes, while the virtual machine is executing on the first host machine, determining, using a live migration tool, a set of modified data stored in the memory of the first host machine while the virtual machine is executing on the first host machine; determining, using the live migration tool, that transferring the set of modified data stored in the memory of the first host machine exceeds a downtime limit; determining, using the live migration tool, that an increased throttling of the virtual machine executing on the first host machine does not exceed a throttling limit; applying the increased throttling to the virtual machine executing on the first host machine; and copying the set of modified data while the increased throttling is applied to the virtual machine executing on the first host machine.

In accordance with some other aspects of the present disclosure, a system is disclosed. The system includes a first host machine having a memory, a second host machine having a memory, and a live migration tool. The live migration tool includes a memory state configured to store a set of data indicative of modified data in the memory of the first host machine during a live migration process and a set of migration limits comprising a throttling limit and a downtime limit. The live migration tool performs a final data transfer to the memory of the second host machine responsive to the set of data indicative of modified data in the memory of the first host machine being below the downtime limit. The live migration tool aborts the live migration responsive to an increased throttling amount exceeding the throttling limit.

The foregoing summary is illustrative only and is not intended to be in any way limiting. In addition to the illustrative aspects, embodiments, and features described above, further aspects, embodiments, and features will become apparent by reference to the following drawings and the detailed description.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a virtual computing system having a plurality of clusters, with each cluster having a plurality of nodes. Each of the plurality of nodes includes one or more virtual machines managed by an instance of a hypervisor. Occasionally, the one or more virtual machines may be migrated from a first host machine to a second host machine. The virtual machines may be managed by a hypervisor, such as an AHV type of hypervisor provided by Nutanix, Inc.

Migrating a virtual machine from a first host machine to a second host machine includes migrating the data of the first host machine to the second host machine such that when the virtual machine begins operations on the second host machine, the virtual machine has the same configuration and data. In some instances, migration is done when a virtual machine is offline, thereby only necessitating the migration of stored data and configuration settings. However, offline virtual machines result in downtime to a user, which may be unacceptable. Thus, live migration has been implemented to migrate a virtual machine from one host machine to a second host machine. Live migration includes migrating a memory data state from the first host machine to the second host machine such that when the virtual machine operation is transferred to the second host machine, such as via one or more hypervisors, the virtual machine accesses identical memory state data so applications or other processes being executed do not incur errors or faults.

Some live migration processes includes making an initial copy of the memory data to the second host machine memory, then copying changes to the memory data to both location until the virtual machine can be finally migrated at a time to incur minimal downtime. However, such a process can result in lengthy or even impossible live migrations if memory data is frequently changed and/or network data transfer rates are slow.

In other implementations, the live migration process can include iteratively copying any memory that has been changed until convergence is reached. The iterative copying is performed until the virtual machine can be finally migrated at a time to incur minimal downtime. Similar to the writing through described above, the iterative copying can also result in lengthy or even impossible live migrations if memory data is frequently changed and/or network data transfer rates are slow. As a result, in some implementations, the virtual machine processing and/or memory writing is "stunned" or throttled to slow the change in memory data until the virtual machine can be finally migrated at a time to incur minimal downtime. Such throttling affects the performance of the virtual machine by artificially slowing the virtual machine, which if done too much, can be unacceptable to a user.

Accordingly, the present disclosure provides solutions to the aforementioned problems. In particular, the present disclosure provides for a throttle or rate limit and a downtime limit that may be implemented to allow users of virtual machines to set limits for live migration that are acceptable to their performance expectations. Such limits may be adjustable by the user and/or predetermined based on a prior agreement.

Thus, the present disclosure provides an easy and adjustable system for maintaining operability of virtual machines up to user expectations while providing for live migration when permissible within the user's defined limits.

Figure 1:
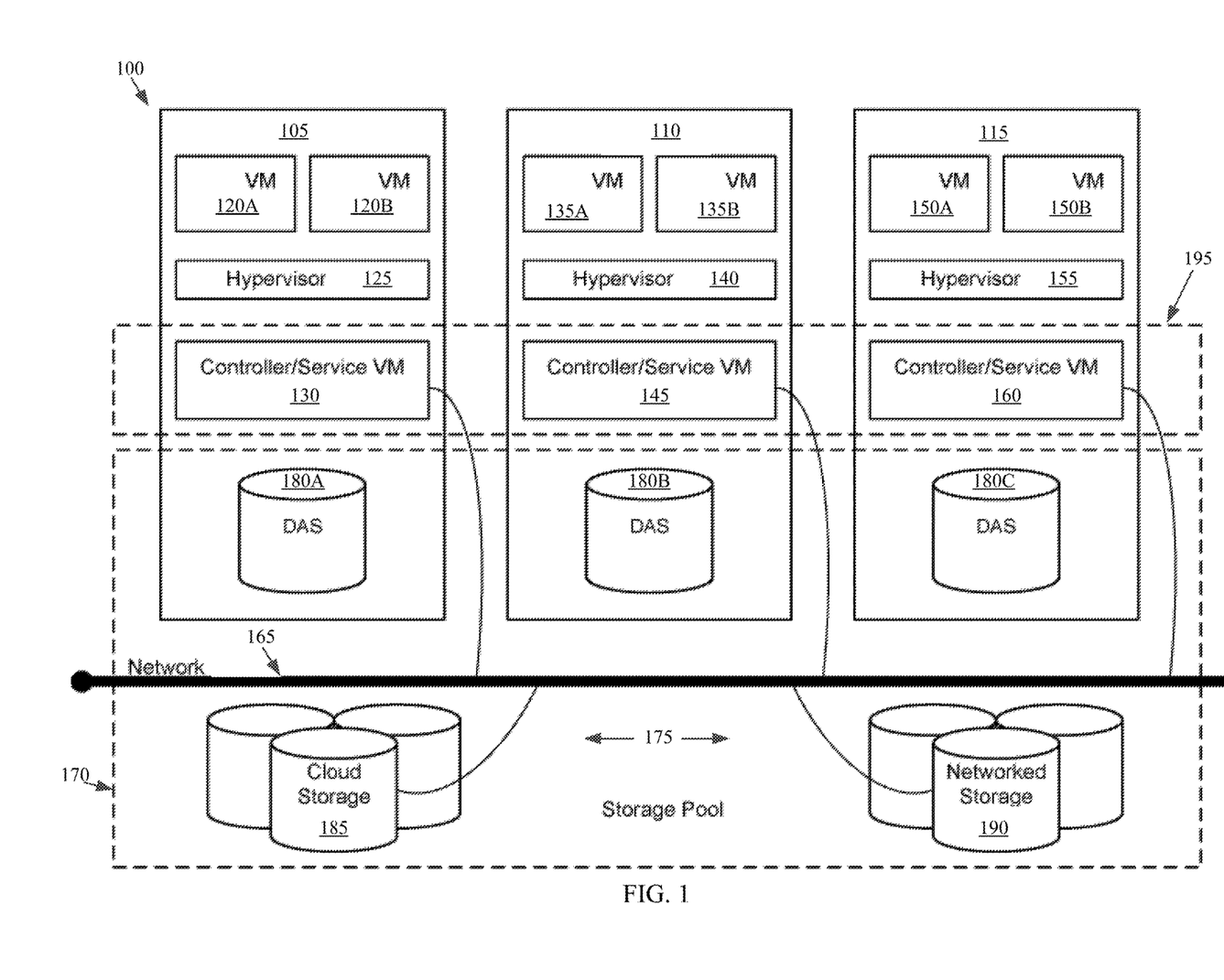
FIG. 1 is a block diagram of a virtual computing system, in accordance with some embodiments of the present disclosure.

Referring now to FIG. 1, a virtual computing system 100 is shown, in accordance with some embodiments of the present disclosure. The virtual computing system 100 includes a plurality of nodes, such as a first node 105, a second node 110, and a third node 115. The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the virtual computing system 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The virtual computing system 100 also includes a storage pool 170. The storage pool 170 may include network-attached storage 175 and direct-attached storage 180A, 180B, and 180C. The network-attached storage 175 may be accessible via the network 165 and, in some embodiments, may include cloud storage 185, as well as local storage area network 190. In contrast to the network-attached storage 175, which is accessible via the network 165, the direct-attached storage 180A, 180B, and 180C may include storage components that are provided within each of the first node 105, the second node 110, and the third node 115, respectively, such that each of the first, second, and third nodes may access its respective direct-attached storage without having to access the network 165.

It is to be understood that only certain components of the virtual computing system 100 are shown in FIG. 1. Nevertheless, several other components that are needed or desired in the virtual computing system to perform the functions described herein are contemplated and considered within the scope of the present disclosure. Additional features of the virtual computing system 100 are described in U.S. Pat. No. 8,601,473, the entirety of which is incorporated by reference herein.

Although three of the plurality of nodes (e.g., the first node 105, the second node 110, and the third node 115) are shown in the virtual computing system 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150). Additionally, more than a single instance of the hypervisor (e.g., the hypervisor 125, the hypervisor 140, and the hypervisor 155) and/or the controller/service VM (e.g., the controller/service VM 130, the controller/service VM 145, and the controller/service VM 160) may be provided on the first node 105, the second node 110, and/or the third node 115.

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may also be organized in a variety of network topologies, and may be termed as a "host" or "host machine."

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory (ROM) device and copy the instructions in an executable form to a temporary memory device that is generally some form of random access memory (RAM). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 175 may include any of a variety of network accessible storage (e.g., the cloud storage 185, the local storage area network 190, etc.) that is suitable for use within the virtual computing system 100 and accessible via the network 165. The storage pool 170 including the network-attached storage 175 and the direct-attached storage 180A, 180B, and 180C may together form a distributed storage system configured to be accessed by each of the first node 105, the second node 110, and the third node 115 via the network 165, the controller/service VM 130, the controller/service VM 145, and the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine in the virtual computing system 100. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, respectively, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow.

The user VMs 120, the user VMs 135, and the user VMs 150 are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may also include a local management system (e.g., Prism Element from Nutanix, Inc.) configured to manage various tasks and operations within the virtual computing system 100.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc., for running the user VMs 120, the user VMs 135, and the user VMs 150, respectively, and for managing the interactions between the user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the virtual computing system 100.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the virtual computing system 100. The leader node may also be configured to receive and handle requests (e.g., user requests) from outside of the virtual computing system 100. If the leader node fails, another leader node may be designated. Furthermore, one or more of the first node 105, the second node 110, and the third node 115 may be combined together to form a network cluster (also referred to herein as simply "cluster.") Generally speaking, all of the nodes (e.g., the first node 105, the second node 110, and the third node 115) in the virtual computing system 100 may be divided into one or more clusters. One or more components of the storage pool 170 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120, the user VMs 135, and the user VMs 150 that are part of a cluster are configured to share resources with each other. In some embodiments, multiple clusters may share resources with one another.

Further, in some embodiments, although not shown, the virtual computing system 100 includes a central management system (e.g., Prism Central from Nutanix, Inc.) that is configured to manage and control the operation of the various clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components of the virtual computing system 100 are shown and described herein. Nevertheless, other components that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Figure 2A:
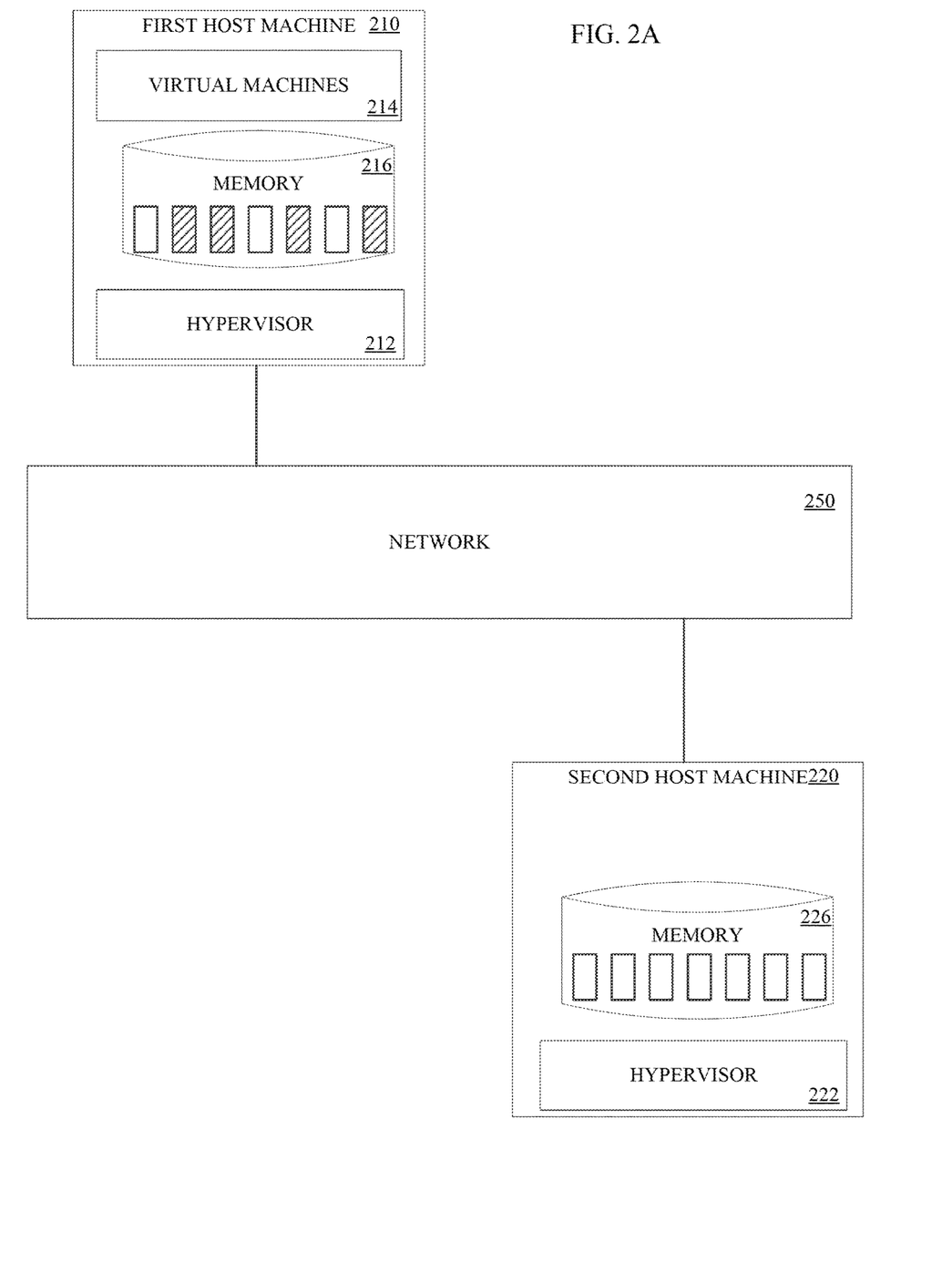
FIGS. 2A-2C are block diagrams illustrating a live migration from a first host machine to a second host machine for the virtual computing system of FIG. 1, in accordance with some embodiments of the present disclosure.
Figure 2B:
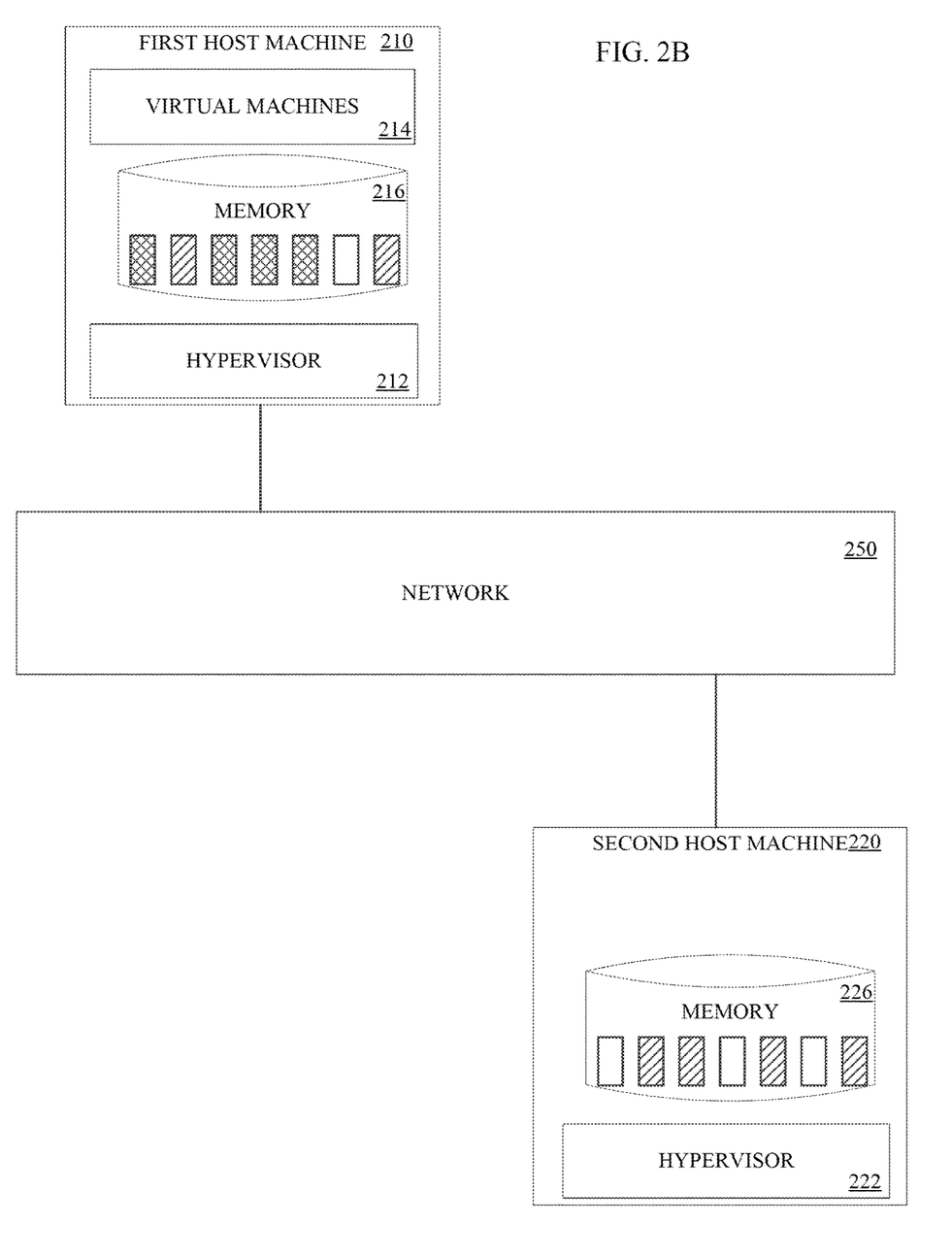
Figure 2C:
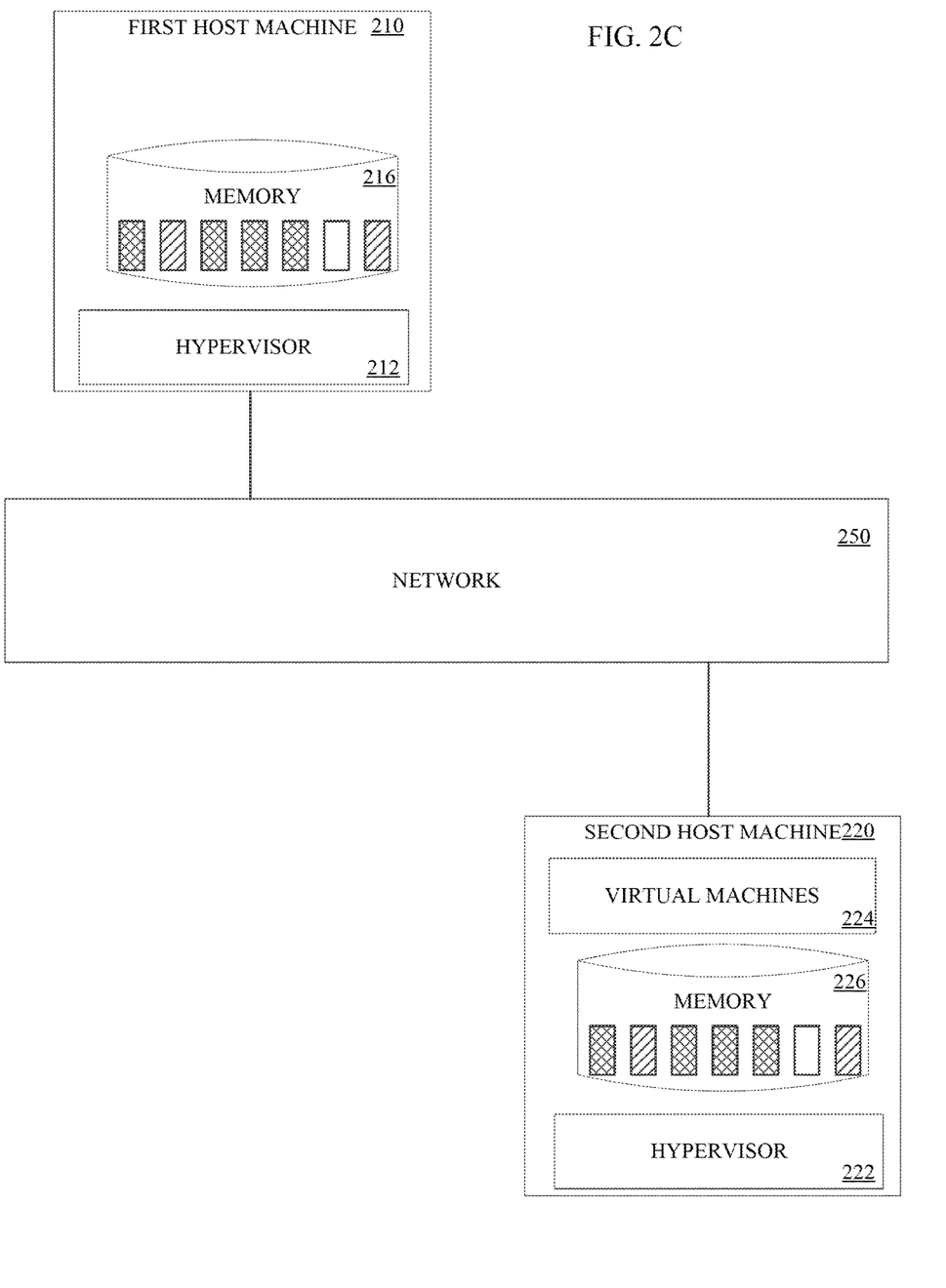

Turning to FIGS. 2A-2C, a block diagram of a system with a first host machine 210 and a second host machine 220 connected via a network 250 for live migration is shown, in accordance with some embodiments of the present disclosure. For live migration, the data in a memory 216 of the first host machine 210 needs to be copied to the memory 226 of the second host machine 220. Once the memory data is copied, the virtual machine 214 can be migrated to the second host machine 220, as shown in FIG. 2C. In the implementation shown in FIG. 2A, the first host machine 210 includes one or more virtual machines 214 executing on the first host machine 210 and utilizing the memory 216 to store data. The memory 216 may include, but is not limited to, any permanent memory device like a read only memory (ROM) device, temporary memory device such as random access memory (RAM) any type of magnetic storage devices (e.g., hard disk, floppy disk, magnetic strips, etc.), optical disks (e.g., compact disk (CD), digital versatile disk (DVD), etc.), smart cards, solid state devices, etc. A hypervisor 212 can create and run the one or more virtual machines 214 on the first host machine 210. The first host machine 210 can be analogous to host machine 105, 110, 115 discussed with respect to FIG. 1 above. In the implementation shown, the first host machine 210 is in communication with a network 250. The network 250 can also be analogous to the network 165 discussed with respect to FIG. 1 above.

The second host machine 220 includes a memory 226 to store data. The memory 226 may include, but is not limited to, any permanent memory device like a read only memory (ROM) device, temporary memory device such as random access memory (RAM) any type of magnetic storage devices (e.g., hard disk, floppy disk, magnetic strips, etc.), optical disks (e.g., compact disk (CD), digital versatile disk (DVD), etc.), smart cards, solid state devices, etc. A hypervisor 22 can create and run the one or more virtual machines 224 on the second host machine 220.

Referring to FIG. 2A, the memory 216 of the first host machine 210 has certain data (depicted by hashing) written to it that is not present on the memory 226 of the second host machine 220. As shown in FIG. 2B, an initial copy of the data from the memory 216 of the first host machine 210 can be copied to the memory 226 of the second host machine 220. However, as shown in FIG. 2B, as the data from the memory 216 is copied to the memory 226, the one or more virtual machines 214 executing on the first host machine 210 may change the data stored in the memory 216 on the first host machine 210. Thus, one or more processes can be implemented to converge the data of the first memory 216 with the data copied to the memory 226 of the second host machine 220 to which the one or more virtual machines 214 are to be migrated, as will be described in greater detail in reference to FIGS. 3-4. Once the memory 226 has been converged with the memory 216, shown in FIG. 2C, then the hypervisor 222 of the second host machine 220 can create and/or transfer the virtual machines 214 operating on the first host machine 210 to the second host machine 220 to continue operating substantially uninterrupted on the second host machine 220.

Figure 3:
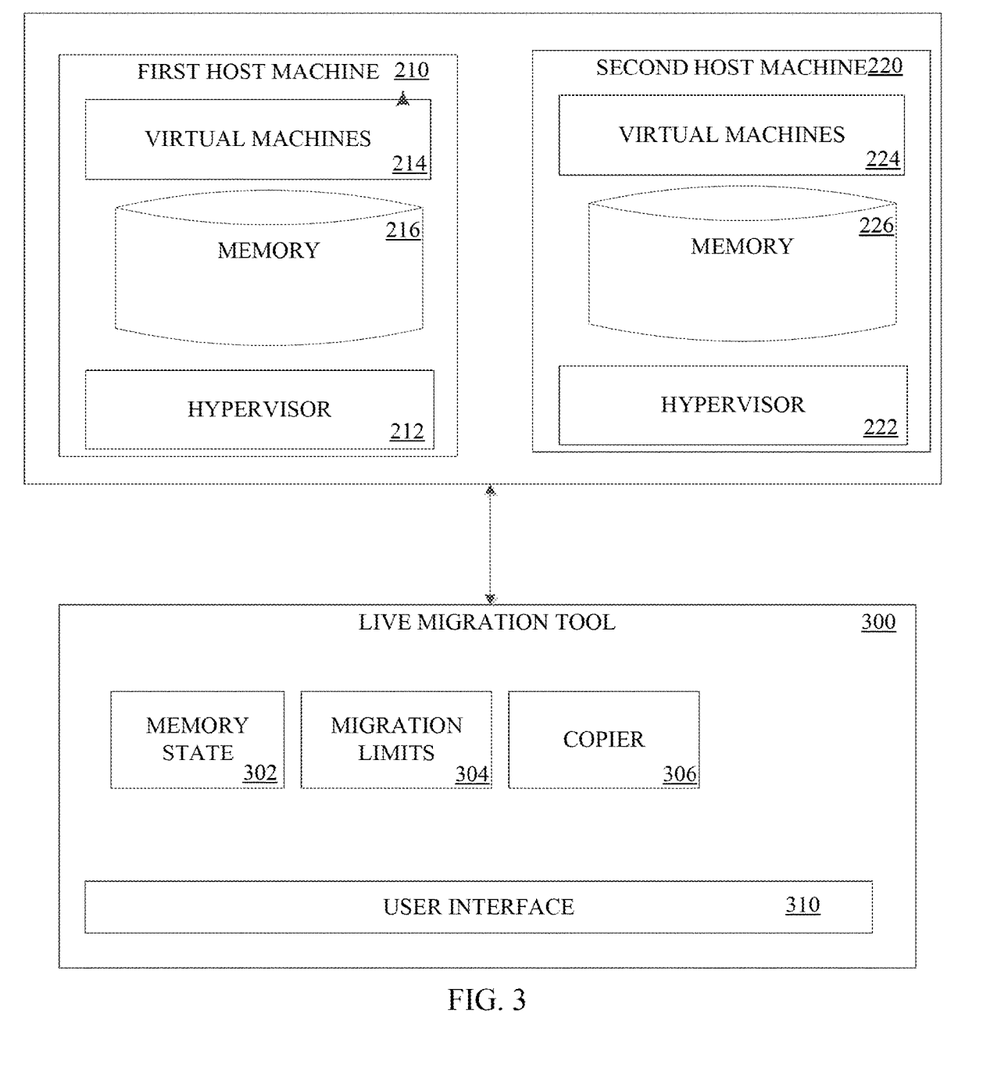
FIG. 3 is a block diagram of a live migration tool for migrating virtual machines of the virtual computing system of FIG. 1, in accordance with some embodiments of the present disclosure.

Referring to FIG. 3, a live migration tool 300 can be implemented to migrate one or more virtual machines 214 from the first host machine 210 to the second host machine 220. The live migration tool 300 can be implemented as part of a hypervisor 212 on the first host machine 210, as part of a hypervisor 222 on the second host machine 220, as part of a controller/service VM, as part of a central management system, and/or as a third-party component. The live migration tool 300 facilitates the live migration of a virtual machine 214 from the first host machine 210 to the second host machine 220 such that a throttling or a downtime of the virtual machine during the migration is minimized and/or within defined limits. By managing the throttling and/or the downtime of the virtual machines, the present disclosure optimizes the functioning of the virtual machines and increases user satisfaction.

To facilitate the live migration of the virtual machines 214 from the first host machine 210 to the second host machine 220, a live migration tool 300 is provided. The live migration tool 300 may be configured as hardware, software, firmware, or a combination thereof. Specifically, the live migration tool 300 may include one or more processing units configured to execute instructions and one or more memory units to store those instructions and other conversion related data. In some embodiments, the live migration tool 300 may be connected to a storage pool (e.g., the storage pool 170) to receive, send, and process information, and to control the operations of the conversion. The instructions may be carried out by a special purpose computer, logic circuits, or hardware circuits of the live migration tool 300. The processing units may, thus, be implemented in hardware, firmware, software, or any combination thereof. The processing units execute an instruction, meaning that they perform the operations called for by that instruction. The processing units may retrieve a set of instructions from a memory (e.g., the storage pool 170 or any other memory associated with the migration tool in which such instructions may be stored). For example, in some embodiments, the processing units may retrieve the instructions from a permanent memory device like a read only memory (ROM) device and copy the instructions in an executable form to a temporary memory device that is generally some form of random access memory (RAM). The ROM and RAM may both be part of the storage pool (e.g., the storage pool 170), or in some embodiments, may be separately provisioned from the storage pool. Further, the processing units may include a single stand-alone processing unit, or a plurality of processing units that use the same or different processing technology. The instructions may be written using one or more programming language, scripting language, assembly language, etc.

Referring still to FIG. 3, the live migration tool 300 includes a plurality of components for facilitating the live migration of the virtual machines 214 from the first host machine 210 to the second host machine 220. For example, the live migration tool 300 includes a memory state 302, migration limits 304, and a copier 306. Although the memory state 302, migration limits 304, and copier 306 are shown as separate components, in some embodiments, the memory state 302, migration limits 304, and copier 306 may be combined into a single component.

The memory state 302 may include a current data capture system that is configured to capture the current data stored in the memory 216 of the first host machine 210. By capturing the existing data in the memory 216, the memory state 302 can be used as the source of the data for copying to the memory 226 of the second host machine 220 and/or for determining the changed or "dirtied" data of the memory 216 while the copying is ongoing. In some implementations, the memory state 302 can maintain a table of memory locations or pointers that have been accessed or modified by the virtual machine 214 executing on the first host machine 210 as a table of "dirtied" data. Although the memory state 302 has been shown as being part of the live migration tool 300, in other embodiments, the memory state 302 may be separate from the live migration tool 300.

The live migration tool 300 also includes migration limits 304. The migration limits 304 can include a throttling limit and/or a downtime limit. In some implementations, the throttling limit and/or downtime limit can be fixed or predetermined limits, such as a fixed percentage of throttling and/or a fixed time period for downtime. The throttling limit can be in any measurable form, such as a percentage or numerical value. Similarly, the downtime limit can be a specific numerical downtime, such as 100 milliseconds, or a percentage, such as 0.0005% of up-time. In still further implementations, the throttling limits and/or downtime limits may be variable limits. The variable limits can be based on operations by the virtual machine, such as if certain applications are being executed a first throttling and/or downtime limit may be applicable, and if the certain applications are not executing, then a second throttling and/or downtime limit may be used. In still further variations, the variable throttling and/or downtime limits may be adjustable by a user of the virtual machine 210, such as via a user interface 310. In still other implementations, the variable limit may be based on a time of day, a day of the week, etc. The user interface 310 is used to receive an input from a user of the virtual machine and/or from a user of a hypervisor to set the throttling limit and/or downtime limit. The user interface 310 may present one or more displays with features (e.g., virtual sliders, knobs, text entry boxes, radio selection buttons, etc.) to the user for adjusting the throttling limit and/or downtime limit. The user may interact with the features to change or set the throttling limit and/or downtime limit. Although the migration limits 304 have been shown as being part of the live migration tool 300, in other embodiments, the migration limits 304 may be separate from the live migration tool 300.

The copier 306 copies the data from the memory 216 of the first host machine 210 and/or the memory state 302 to the memory 226 of the second host machine 220. Although the copier 306 has been shown as being part of the live migration tool 300, in other embodiments, the copier 306 may be separate from the live migration tool 300.

It is to be understood that only some components of the live migration tool 300 are shown and described herein. Nevertheless, other components that are considered desirable or needed to perform the functions described herein are contemplated and considered within the scope of the present disclosure.

Figure 4:
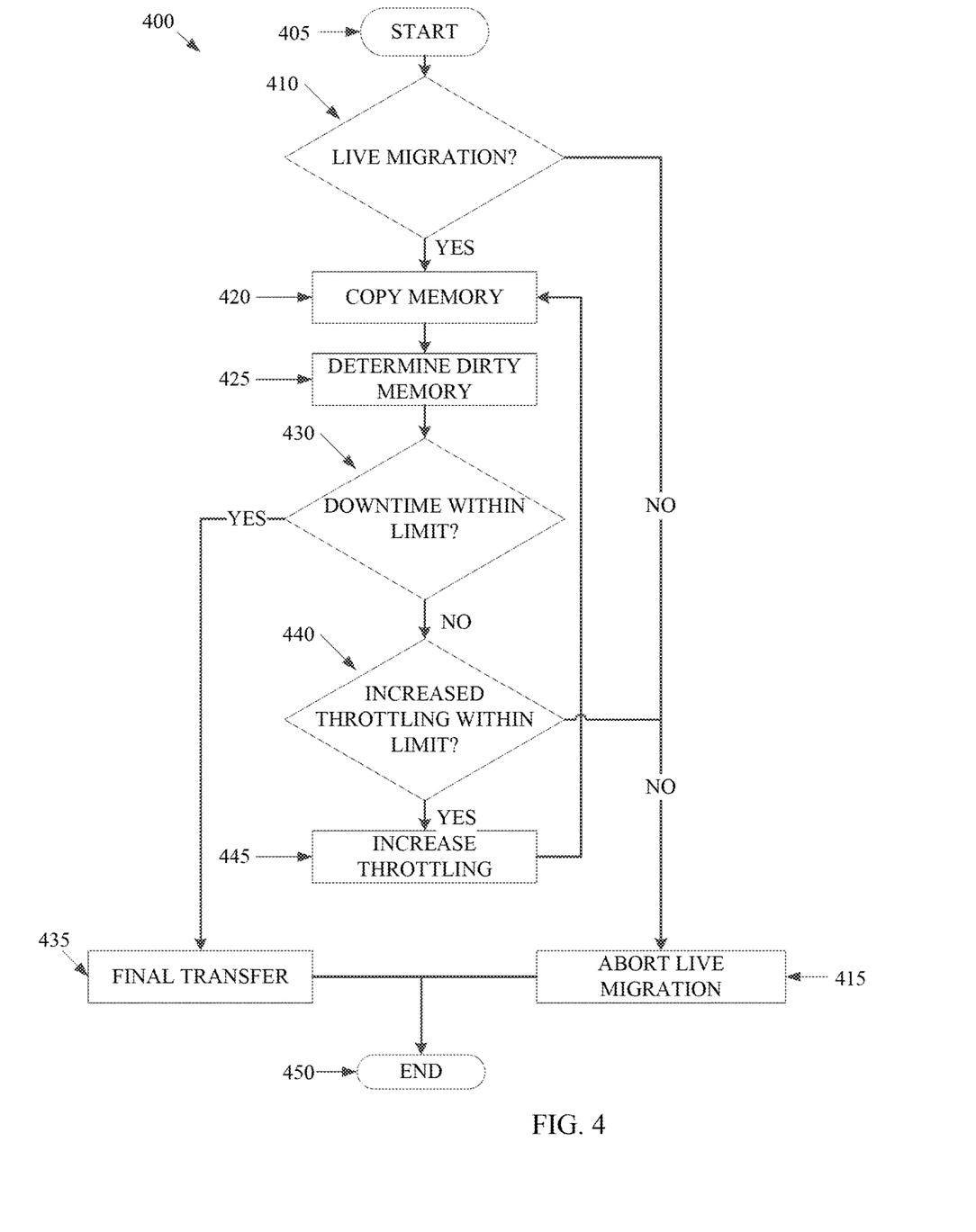
FIG. 4 is a process diagram of operations for live migrating virtual machines using throttling and downtime limits for the virtual computing system of FIG. 1, in accordance with some embodiments of the present disclosure.

Turning now to FIG. 4, a flowchart outlining a process 400 for live migrating a virtual machine, such as virtual machine 214, from a first host machine, such as host machine 210, to a second host machine, such as host machine 220, is shown, in accordance with some embodiments of the present disclosure. The process 400 may include additional, fewer, or different operations, depending on the particular embodiment. Further, the process 400 is described in conjunction with FIGS. 2A-3. Thus, the process 400 is used for controlling the live migration process to remain within acceptable or required throttling or downtime limits.

The process 400 starts at operation 405 with determining whether a live migration is to occur 410. If no live migration is to occur or certain pre-conditions are not met, such as network conditions, or availability of a destination host machine, then the live migration can be aborted 415 and the process 400 ends 450. If a live migration is to be performed and/or the pre-conditions for the live migration are met, then the process 400 proceeds to copying the data 420 from the memory 216 to the memory 226 using the copier 306. The initial copy of the memory 216 occurs while the virtual machine 214 is operating, thus, the process 400 includes determining the data in memory that has been modified and/or accessed (e.g., "dirtied") 425. Such modified or accessed data may differ from the data transferred to the memory 226 of the second host machine 220. Thus, the live migration tool 300 can maintain a table or other mapping of the modified or accessed locations in the memory 216 in the memory state 302 while the copier 306 is copying the initial memory data to the memory 226 of the second host device 220.

The process 400 continues to determine if an expected downtime to perform a final copy of the modified memory would be within the downtime limit 430. As noted above, the downtime limit can be a fixed limit and/or a variable limit. The fixed limit can be, for example, a fixed amount of downtime, such as 100 ms. The variable limit could be based on a time of day, operations being performed by the virtual machine, etc. Determining the downtime is within the downtime limit can include calculating an amount of time based on a network transfer speed, such as the data transfer rate of the prior data copy, and the determined amount of modified memory 425. If the downtime is within the limit, then a final data transfer 435 is performed by pausing the virtual machine, copying the remaining modified data from the memory 216 to the memory 226 using the copier 306, migrating or creating an instance of the virtual machine 224 on the second host machine 220, and resuming the virtual machine 224 operation using the now-converged data of memory 226. Once the final transfer 435 occurs, the process 400 ends. In some implementations, if the downtime limit is reached while the final transfer 435 is still occurring, the live migration process 400 can be aborted 415 and the virtual machine 214 can resume on the first host machine 210. In some implementations, if the downtime limit is reached and/or the process proceeds to be aborted 415, an interim operation can include providing an override interface, such as to an administrator of the hypervisor or a user of the virtual machine 214, to continue the final data transfer 435 and/or otherwise force the migration of the virtual machine 214 to the second host machine 220.

If the downtime is not within the downtime limit, then the process 400 proceeds to determine if an increased throttling will be within the throttling limit 440. Determining if the next incremental throttling amount is within the throttling limit can include accessing a predetermined next incremental throttling amount and comparing the next incremental throttling amount to the throttling limit (e.g., if the virtual machine throttling occurs at predetermined increments, the next increment can be accessed and compared). If the increased throttling amount is variable or otherwise not a predetermined value, then the increased throttling amount is first calculated and compared to the throttling limit. If the increased throttling amount is not within the throttling limit, then the live migration is aborted 415. If the increased throttling amount is within the throttling limit, then the throttling is increased 445 and the process 400 returns to copying the next incremental amount of memory 420. The next incremental amount of memory can be the data in the memory 216 that was modified since the prior copy, such as that tracked in the memory state 302.

The process 400 iterates through increasing throttling until the final transfer 435 occurs or the live migration is aborted 415, and then the process ends 450.

Thus, the present disclosure provides a system and method for implementing throttling and/or downtime limits for live migrating virtual machines in an efficient, easy, and automatic manner.

Although the present disclosure has been described with respect to software applications, in other embodiments, one or more aspects of the present disclosure may be applicable to other components of the virtual computing system 100 that may be suitable for real-time monitoring by the user.

It is also to be understood that in some embodiments, any of the operations described herein may be implemented at least in part as computer-readable instructions stored on a computer-readable memory. Upon execution of the computer-readable instructions by a processor, the computer-readable instructions may cause a node to perform the operations.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
copying, using a migration tool, initial data stored in a first host machine to a second host machine;
identifying, using the migration tool, a set of modified data stored in the first host machine;
determining, using the migration tool, that an expected amount of time for transferring the set of modified data to the second host machine would exceed a downtime limit for a virtual machine executing on the first host machine;
determining, using the migration tool, that an increased throttling of the virtual machine would not exceed a throttling limit, wherein the increased throttling is applied to the virtual machine; and
copying, using the migration tool, the set of modified data to the second host machine while the increased throttling is applied to the virtual machine.

2. The method of claim 1, wherein the downtime limit is a predetermined period of time.

3. The method of claim 1, wherein the downtime limit is a variable period of time based on operations of the virtual machine.

4. The method of claim 1, wherein the throttling limit is a predetermined throttling amount.

5. The method of claim 1, wherein the throttling limit is a variable throttling amount based on operations of the virtual machine.

6. The method of claim 1 further comprising:
determining, using the migration tool, that the expected amount of time for transferring the set of modified data to the second host machine would be less than or equal to the downtime limit; and
transferring, using the migration tool, the set of modified data to the second host machine.

7. The method of claim 6 further comprising:
determining, using the migration tool, that an elapsed amount of time for transferring the set of modified data exceeds the downtime limit; and
aborting, using the migration tool, a live migration of the virtual machine to the second host machine.

8. The method of claim 1 further comprising:
determining, using the migration tool, that a second increased throttling applied to the virtual machine exceeds the throttling limit; and
aborting, using the migration tool, a live migration of the virtual machine to the second host machine.

9. The method of claim 1, wherein the downtime limit is modifiable via a user interface.

10. The method of claim 1, wherein the throttling limit is modifiable via a user interface.

11. A non-transitory computer-readable medium storing computer code to cause a computer to perform a method comprising:
copying initial data stored in a first host machine to a second host machine; and
while a virtual machine is executing on the first host machine:
determining a set of modified data stored in the first host machine;
determining that an expected amount of time to transfer the set of modified data to the second host machine would exceed a downtime limit for the virtual machine;
determining that an increased throttling of the virtual machine would not exceed a throttling limit;
applying the increased throttling to the virtual machine; and
copying the set of modified data to the second host machine while the increased throttling is applied to the virtual machine.

12. The non-transitory computer-readable medium of claim 11, wherein the downtime limit is a predetermined percentage.

13. The non-transitory computer-readable medium of claim 11, wherein the downtime limit is a variable period of time based on an application executing on the virtual machine.

14. The non-transitory computer-readable medium of claim 11, wherein the throttling limit is a predetermined throttling percentage.

15. The non-transitory computer-readable medium of claim 11 further comprising, while the virtual machine is executing on the first host machine:
determining that a second increased throttling applied to the virtual machine exceeds the throttling limit; and
aborting a live migration of the virtual machine to the second host machine.

16. A system comprising:
a first host machine comprising a processor and a memory;
a second host machine comprising a processor and a memory; and a migration tool comprising:
- a memory state that stores a set of modified data in the first host machine during a live migration process of a virtual machine from the first host machine to the second host machine, and
- a set of migration limits comprising a throttling limit and a downtime limit for the virtual machine,
- wherein the migration tool performs a final data transfer of the set of modified data to the second host machine responsive to determining that an expected amount of time to transfer the set of modified data to the second host machine would be at or below the downtime limit, and
- wherein the migration tool aborts the live migration process responsive to an increased throttling amount being applied to the virtual machine exceeding the throttling limit.

17. The system of claim 16, wherein the downtime limit is a predetermined period of time.

18. The system of claim 16, wherein the throttling limit is a predetermined throttling amount.

19. The system of claim 16, wherein the migration tool aborts the live migration process if an elapsed time of the final data transfer of the set of modified data exceeds the downtime limit.

20. The system of claim 16, wherein the migration tool is part of a hypervisor of the first or the second host machine.

* * * * *